United States Patent
Steinlage et al.

(10) Patent No.: US 12,514,145 B2
(45) Date of Patent: Jan. 6, 2026

(54) MULTI-SECTION HINGED AGRICULTURAL EQUIPMENT

(71) Applicant: DEERE & COMPANY, Moline, IL (US)

(72) Inventors: David L. Steinlage, Centralia, KS (US); Shawn J. Becker, Centralia, KS (US); Robert T. Casper, Davenport, IA (US); Isaac A. Lopez, Garza Garcia NL (MX); Jerry R. Merkle, Altoona, IA (US); Anthony Sikora, Ankeny, IA (US); Byron J. Hobart, Truro, IA (US)

(73) Assignee: Deere & Company, Moline, IL (US)

( * ) Notice: Subject to any disclaimer, the term of this patent is extended or adjusted under 35 U.S.C. 154(b) by 88 days.

(21) Appl. No.: 17/412,670

(22) Filed: Aug. 26, 2021

(65) Prior Publication Data
US 2023/0062893 A1    Mar. 2, 2023

(51) Int. Cl.
*A01B 73/04*    (2006.01)
*A01B 73/02*    (2006.01)

(52) U.S. Cl.
CPC ............ *A01B 73/046* (2013.01); *A01B 73/02* (2013.01)

(58) Field of Classification Search
CPC ..... A01B 73/02; A01B 73/046; A01B 73/065; A01B 15/14; A01B 35/30; A01B 39/24; A01B 73/04; A01B 73/06
See application file for complete search history.

(56) References Cited

U.S. PATENT DOCUMENTS

| | | | | |
|---|---|---|---|---|
| 4,042,044 A | * | 8/1977 | Honnold | A01B 73/067 |
| | | | | 172/311 |
| 4,178,009 A | * | 12/1979 | Worick | B60D 1/14 |
| | | | | 172/311 |
| 4,619,330 A | * | 10/1986 | Machnee | A01B 35/30 |
| | | | | 172/632 |

(Continued)

FOREIGN PATENT DOCUMENTS

| | | | | |
|---|---|---|---|---|
| DE | 2944944 A | * | 6/1980 | ........... A01B 73/044 |
| DE | 3136869 A | * | 3/1983 | ............. A01B 15/14 |
| EA | 028133 B1 | * | 10/2017 | |

OTHER PUBLICATIONS

2021 Deere & Company; Deere & Company Website; Link: https://www.deere.com/en/application-equipment/2510h-nutrient-applicator/; "Publication Date unknown but available at least as early as Aug. 26, 2021"; pp. 1-2.

(Continued)

*Primary Examiner* — Christopher J Sebesta
*Assistant Examiner* — Blake E Scoville
(74) *Attorney, Agent, or Firm* — Taft Stettinius & Hollister LLP; Stephen F. Rost (57) ABSTRACT

An example work machine generally includes a main section, a pair of inner wings, a pair of outer wings, a pair of flippers, a work assembly, a ground interface assembly, and a height control assembly. The flippers are pivotable relative to the outer wings about axes that extend in a direction transverse to the travel direction of the work machine. Each flipper includes at least one corresponding work component and at least one corresponding ground interface mechanism. The height control assembly is operable to adjust heights of the work components relative to a ground surface.

17 Claims, 9 Drawing Sheets

(56) References Cited

U.S. PATENT DOCUMENTS

| | | | | |
|---|---|---|---|---|
| 4,658,911 | A * | 4/1987 | Drever | A01B 73/044 172/776 |
| 4,862,758 | A * | 9/1989 | Magee | A01B 73/044 172/311 |
| 4,867,245 | A * | 9/1989 | Stevens | A01B 73/046 172/776 |
| 6,035,942 | A * | 3/2000 | Smith | A01B 59/00 111/59 |
| 6,089,329 | A * | 7/2000 | Smith | A01B 73/046 172/452 |
| 6,761,228 | B2 * | 7/2004 | Dobson | A01B 73/04 172/311 |
| 7,497,269 | B2 * | 3/2009 | Jagow | A01B 73/046 172/311 |
| 8,342,256 | B2 * | 1/2013 | Adams | A01B 73/065 172/311 |
| 8,468,655 | B2 * | 6/2013 | Borkgren | A01B 73/044 16/370 |
| 8,505,645 | B1 * | 8/2013 | Kelly | A01B 73/046 172/311 |
| 8,667,915 | B2 * | 3/2014 | Kuebler | A01C 23/008 280/830 |
| 9,220,188 | B2 * | 12/2015 | Graham | A01D 78/146 |
| 9,622,400 | B2 * | 4/2017 | Sudbrink | A01B 63/32 |
| 9,999,172 | B2 * | 6/2018 | Sudbrink | A01B 3/26 |
| 10,285,323 | B2 * | 5/2019 | Wileniec | A01B 73/046 |
| 10,888,044 | B2 | 1/2021 | Kinzenbaw et al. | |
| 2016/0212929 | A1 * | 7/2016 | Wileniec | A01B 73/048 |
| 2019/0150353 | A1 | 5/2019 | Schlimgen et al. | |
| 2020/0053951 | A1 | 2/2020 | Becker et al. | |

OTHER PUBLICATIONS

2021 CNH Industrial America LLC; Case IH Website: Link: https://www.caseih.com/northamerica/en-us/products/application-equipment/fertilizer-applicators; "Nutri-Placer Fertilizer Applicators"; "Publication Date unknown put available at least as early as Aug. 26, 2021" ; pp. 1-8.

John Deere; Planting Equipment, Drawn and integral planters, ExactEmerge, MaxEmerge 5e, and MaxEmerge 5 row units; Jan. 21, 2020; 52 pages.

John Deere; Field Prep Tools, Rippers, Chisel Plows, Disks, Variable-Intensity Tillage, Mulch Tillers, Reversible Plows, Field Cultivators, Mulch Finishers and Vertical Tillage, Jan. 21, 2020; 36 pages.

John Deere; Nutrient Applicators, Apply here for total solutions; Jan. 21, 2020; 28 pages.

Extended European Search Report and Written Opinion issued in European Patent Application No. 22182655.5, dated Dec. 15, 2022, in 10 pages.

* cited by examiner

MULTI-SECTION HINGED AGRICULTURAL EQUIPMENT

TECHNICAL FIELD

The present disclosure generally relates to hinged agricultural equipment, and more particularly but not exclusively relates to hinged work machines.

BACKGROUND

Agricultural equipment including work machines are frequently formed with multiple sections that are hingedly connected to one another such that the equipment can be folded into a more compact envelope for transportation. While a larger wingspan of the equipment is often desirable for operation, larger wingspans typically require that the equipment have a larger envelope when folded. Larger envelopes can lead to difficulties in transporting the equipment. For example, if the envelope is too wide, the equipment may be difficult or impractical to transport across standard roadways. Additionally, should the envelope be too tall, the equipment may be unable to be transported under lower overpasses. For these reasons among others, there remains a need for further improvements in this technological field.

SUMMARY

An exemplary work machine generally includes a main section, a pair of inner wings, a pair of outer wings, a pair of flippers, a work assembly, a ground interface assembly, and a height control assembly. The flippers are pivotable relative to the outer wings about axes that extend in a direction transverse to the travel direction of the work machine. Each flipper includes at least one corresponding work component and at least one corresponding ground interface mechanism. The height control assembly is operable to adjust heights of the work components relative to a ground surface. Further embodiments, forms, features, and aspects of the present application shall become apparent from the description and figures provided herewith.

DETAILED DESCRIPTION OF ILLUSTRATIVE EMBODIMENTS

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes. In the coordinate system illustrated in FIGS. 1 and 2, the X-axis defines first and second longitudinal directions, the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings.

However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

Figure 1:
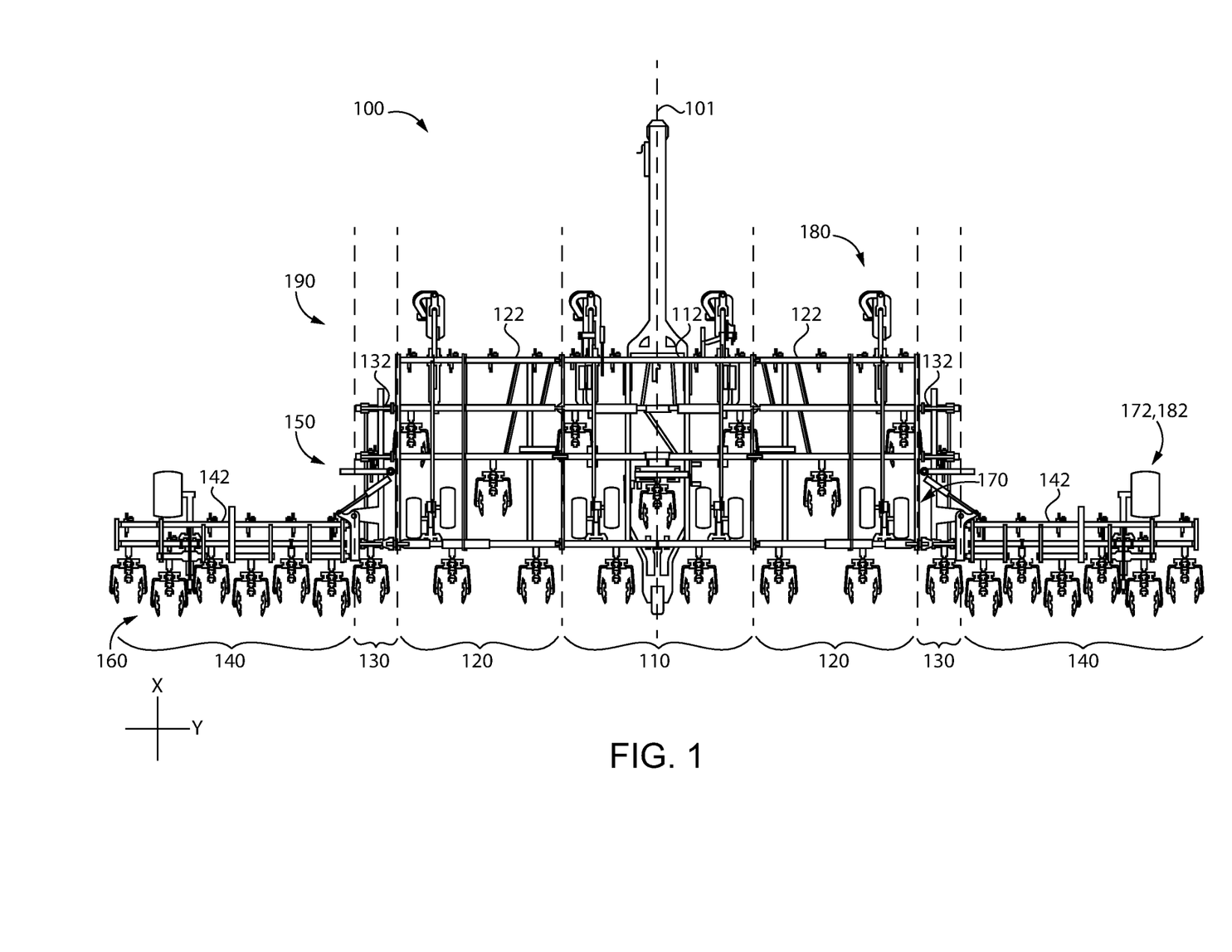
FIG. 1 is a plan view of a work machine according to certain embodiments in an unfolded state.

With reference to FIG. 1, illustrated therein is mobile agricultural equipment in the form of a work machine 100 according to certain embodiments. The work machine 100 comprises a plurality of sections that are hingedly connected to one another, including a main section 110, a pair of inner wing sections or inner wings 120 hingedly connected to the main section 110, a pair of outer wing sections or outer wings 130 hingedly connected to the inner wings 120, and a pair of flipper sections or flippers 140 hingedly connected to the outer wings 130. The work machine 100 further includes an actuating assembly 150 operable to transition the work machine 100 between a deployed state and a folded state, a work assembly 160 operable to perform a primary function of the work machine 100, a ground interface assembly 170 configured to facilitate transport of the work machine 100 across a ground surface 90 (FIG. 9), and a height control assembly 180 operable to control the height of the various sections relative to the ground 90. As described herein, the work machine 100 further includes a hinge assembly 190 that interconnects the sections, as latch mechanisms that selectively retain the flippers 140 in a folded positions, and alignment mechanisms that aid in aligning the components of the latch mechanisms.

Figure 2:
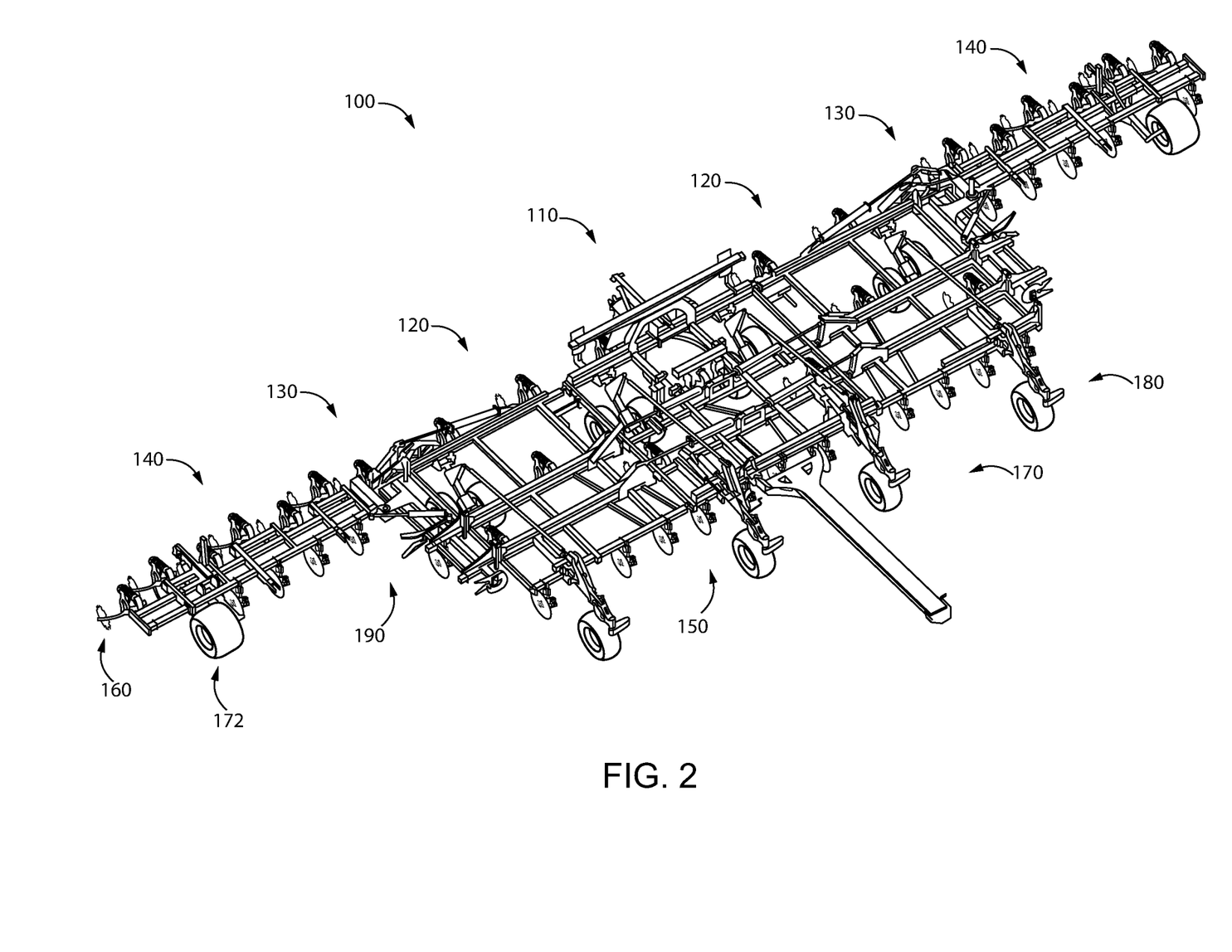
FIG. 2 is a perspective view of the work machine in the unfolded state.

With additional reference to FIG. 2, the main section 110 is provided in the center of the work machine 100, and generally includes a main section frame 112 that extends along a primary longitudinal axis 101 to a hitch 114 by which the work machine 100 can be secured to a towing vehicle. As described herein, the main section 110 also includes portions of the actuating assembly 150, portions of the work assembly 160, portions of the ground interface assembly 170, and portions of the height control assembly 180.

The primary longitudinal axis 101 extends in the direction of travel for the work machine 100, and extends along a central vertical plane relative to which the work machine 100 generally exhibits mirror-image symmetry. As used herein, the terms "laterally outward" and "laterally inward" may be used to describe motion, spacing, or directionality relative to the primary longitudinal axis 101. For example, directions extending away from the primary longitudinal axis 101 may be referred to herein as "laterally outward" directions, and directions extending toward the primary longitudinal axis 101 may be referred to herein as "laterally inward" directions. Unless stated otherwise, such descriptions should be assumed to apply at least when the work machine 100 is in the deployed or unfolded state illustrated in FIGS. 1 and 2.

Moreover, given the relative symmetry of the work machine 100 relative to the central vertical plane along which the primary longitudinal axis 101 extends, certain features that are duplicated on either side of the plane may be referred to in the singular for ease and convenience of description. Unless indicated otherwise, such descriptions may be equally applicable to either lateral side of the equipment. By way of example, a description stating that "the inner wing 120 includes an inner wing frame 122 that is hingedly connected to the main frame 112 via an inner hinge 192" should be understood to indicate that each inner wing 120 includes a corresponding and respective inner wing frame 122 that is hingedly connected to the main frame 112 via a corresponding and respective inner hinge 192.

Figure 3:
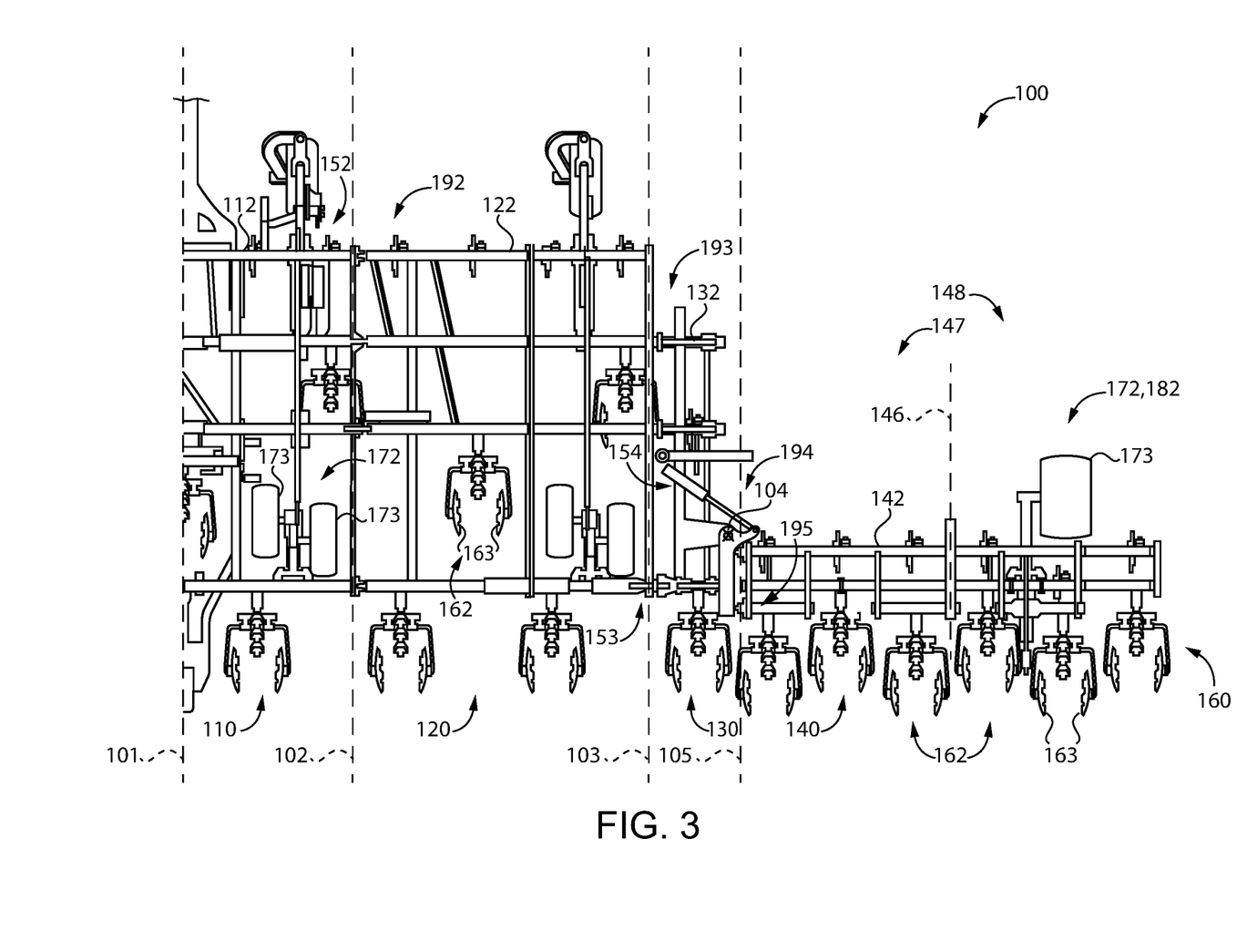
FIG. 3 is a plan view of one lateral half of the work machine in the unfolded state.

With additional reference to FIG. 3, each inner wing section or inner wing 120 includes an inner wing frame 122 that is hingedly connected to the main frame 112 via a corresponding inner wing hinge mechanism or inner hinge 192. More particularly, the laterally inward side of the inner wing frame 122 is connected to the laterally outward side of the main frame 112 via a corresponding one of the inner hinges 192. The inner hinge 192 extends along a longitudinally-extending first axis 102, and facilitates pivoting of the inner wing 120 relative to the main section 110 about the respective first axis 102. In the illustrated form, each first axis 102 is parallel to the primary longitudinal axis 101. It is also contemplated that the first axes 102 may be slightly askew relative to the primary longitudinal axis 101, or that the first axes 102 may extend at an oblique angle relative to the primary longitudinal axis 101.

Each outer wing section or outer wing 130 includes an outer wing frame 132 that is hingedly connected to a corresponding inner wing frame 122 via a corresponding outer wing hinge mechanism or outer hinge 193. More particularly, the laterally inward side of each outer wing frame 132 is connected to the laterally outward side of the corresponding inner wing frame 122 via a corresponding one of the outer hinges 193. The outer hinge 193 extends along a longitudinally-extending second axis 103, and facilitates pivoting of the outer wing 130 relative to the inner wing 120 about the second axis 103. In the illustrated form, each second axis 103 is parallel to the primary longitudinal axis 101. It is also contemplated that the second axes 103 may be slightly askew relative to the primary longitudinal axis 101, or that the second axes 103 may extend at an oblique angle relative to the primary longitudinal axis 101.

Each flipper 140 includes a flipper frame 142 that is hingedly connected to a corresponding outer wing frame 132 via a corresponding first flipper hinge 194. More particularly, the laterally inward side of each flipper frame 142 is connected to the laterally outward side of the corresponding outer wing frame 132 via a corresponding one of the flipper hinges 194. The first flipper hinge 194 extends along a third axis 104, and facilitates pivoting of the flipper 140 relative to the outer wing 130 about the respective third axis 104. In the illustrated form, the third axis 104 extends in a direction transverse to the longitudinal axis 101, and is generally vertical when the work machine 100 is in its unfolded state. It should be appreciated, however, that the third axis 104 may be slightly askew from a true vertical axis when the work machine 100 is in its unfolded state. Each flipper 140 has a longitudinally-extending centerline 146 that divides the flipper 140 into a laterally-inward side 147, which is pivotably connected to the outer wing 130, and a laterally-outward side 148. In the illustrated form, each flipper 140 includes a corresponding ground interface mechanism 172 of the ground interface assembly 170 on its laterally outward side 148, which aids in stabilizing the flipper 140 during movement between its folded and unfolded positions as described herein.

In addition to the first flipper hinge 194, each flipper frame 142 may also be connected to the corresponding outer wing frame 132 via a second flipper hinge 195 that permits limited pivoting of the flipper 142 about a longitudinally extending fourth axis 105. As described herein, the second flipper hinges 195 permit flexing of the work machine 100 when traveling across uneven terrain. In the illustrated form, each fourth axis 105 is parallel to the primary longitudinal axis 101. It is also contemplated that the fourth axes 105 may be slightly askew relative to the primary longitudinal axis 101, or that the fourth axes 104 may extend at an oblique angles relative to the primary longitudinal axis 101. In certain embodiments, the first flipper hinge 194 and the second flipper hinge 195 may be part of a single hinge mechanism. In other embodiments, the first flipper hinge 194 and the second flipper hinge 195 may be separate and distinct hinge mechanisms.

Figure 9:
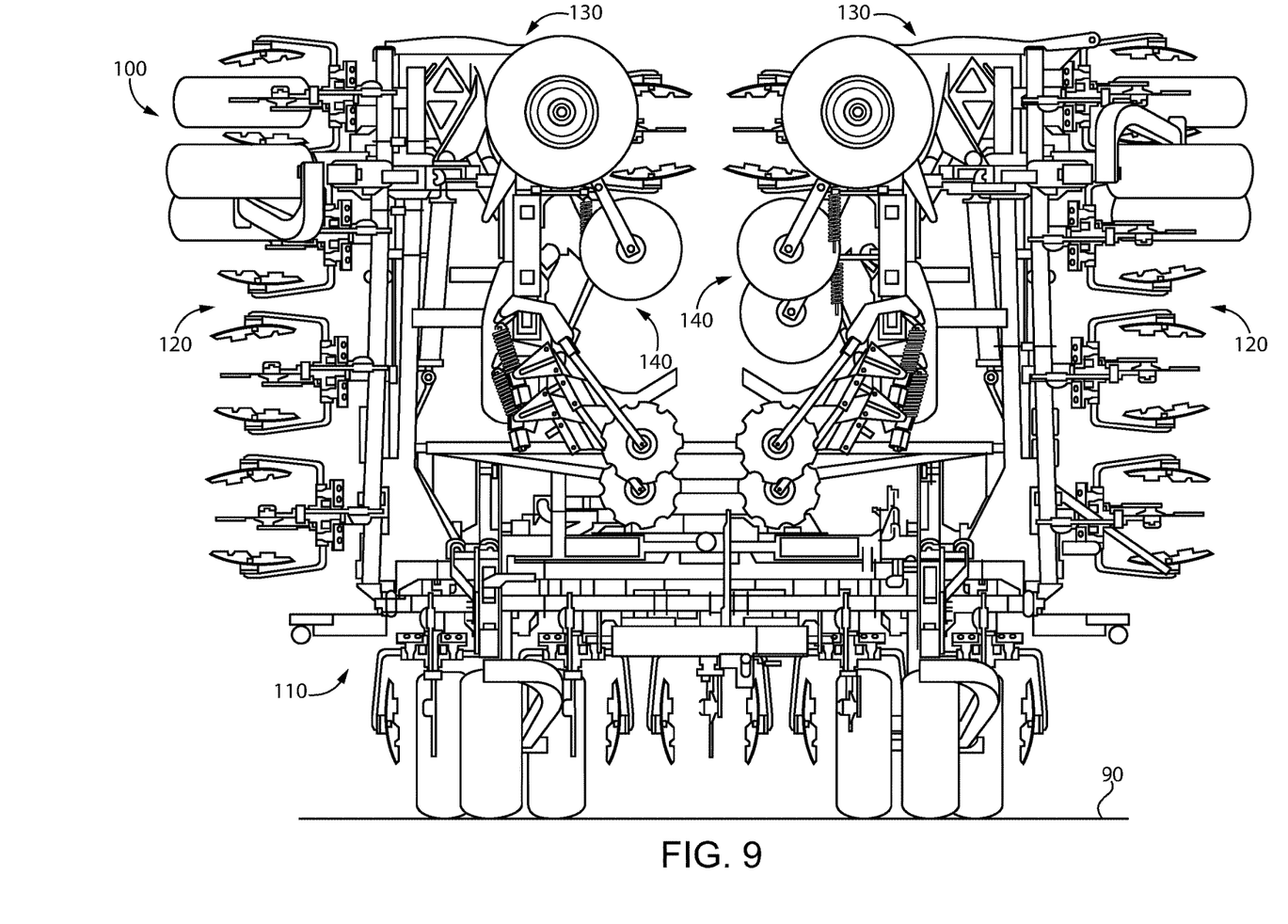
FIG. 9 is a front view of the work machine in a folded state.

The actuator assembly 150 is operable to transition the work machine 100 between its deployed or unfolded state (FIGS. 1 and 2) and its transport or folded state (FIG. 9). The actuator assembly 150 includes a plurality of actuators that facilitate such transitioning, including inner wing actuators 152, outer wing actuators 153, and flipper actuators 154. Each inner wing actuator 152 is connected between the main frame 112 and a corresponding inner wing frame 122 such that the inner wing actuators 152 are operable to pivot the inner wings 120 about the first axes 102. Each outer wing actuator 153 is connected between a corresponding inner wing frame 122 and a corresponding outer wing frame 132 such that the outer wing actuators 153 are operable to pivot the outer wings 120 about the second axes 103. Each flipper actuator 154 is connected between a corresponding outer wing frame 132 and a corresponding flipper frame 142 such that the flipper actuators 154 are operable to pivot the flippers 140 about the third axes 104. In the illustrated form, each actuator 152, 153, 154 is provided in the form of a linear actuator, and more particularly as a hydraulic cylinder assembly. It is also contemplated that one or more of the actuators 152, 153, 154 may be provided in another form, such as a linear motor. Further details regarding the operation of the actuator assembly 150 for folding and unfolding the work machine 100 are provided below.

The work assembly 160 is configured to perform a primary work function of the work machine 100, and generally includes a plurality of work components 162, each configured to facilitate the performance of the primary work function. In the illustrated form, a primary work function of the work machine 100 is plowing, and each of the work components 162 includes a chisel plow 163. In certain embodiments, each work component 162 may be connected with one or more transmissions that facilitate performance of the work function(s) of the work component 162. It is also contemplated that the work components 162 may not necessarily be connected with a transmission, for example in the event that the work component 162 is self-sufficient. By way of example, the chisel plows 163 may not necessarily be powered, and may instead simply rip through the earth as the work machine 100 travels along the ground 90.

While the illustrated work assembly 160 includes work components 162 in the form of chisel plows 163, it should be appreciated that other work components are contemplated, such as planters, distributors of agricultural product (e.g., anhydrous ammonia, pesticide, fertilizer, and/or seed), or other forms of plow. Should the work components 162 not be self-sufficient, such work components may be connected to a source via a transmission. For example, should the work components 162 require power, the work components 162 may be connected to a power source (e.g., a power takeoff) via a power transmission. As another example, should the work components 162 be provided as distributors, the work components 162 may be connected with a source of agricultural product (e.g., a tank) via a product transmission system (e.g., an air distributor).

As will be appreciated, the work assembly 160 may be distributed across the various sections of the work machine 100 to ensure that the work machine 100 is capable of performing its primary work function(s) across substantially its entire lateral length when in the unfolded or deployed state. In the illustrated form, one or more work components 162 are mounted to the main frame 112, one or more work components 162 are mounted to each of the inner wing frames 122, one or more work components 162 are mounted to each of the outer wing frames 132, and one or more work components 162 are mounted to each of the flipper frames 142. As a result, the main section 110, each inner wing 120, each outer wing 130, and each flipper 140 may be considered to include or comprise a corresponding portion of the work assembly 160. It is also contemplated that one or more of the sections may not necessarily include a corresponding portion of the work assembly 160.

The ground interface assembly 170 provides an interface between the work machine 100 and the ground 90 along which the equipment 100 travels, and includes a plurality of ground interface mechanisms 172. In the illustrated form, the ground interface mechanisms 172 are provided in the form of wheels 173. It is also contemplated that one or more of the ground interface mechanisms 172 may take another form, such as that of a track or of a skid. In order to provide support for the work machine 100 across its lateral length, the ground interface mechanisms 172 may be distributed across the various sections of the work machine 100. In the illustrated form, one or more ground interface mechanisms 172 are mounted to the main frame 112, one or more ground interface mechanisms 172 are mounted to each of the inner wing frames 122, and one or more ground interface mechanisms 172 are mounted to each of the flipper frames 142. As a result, the main section 110, each inner wing 120, and each flipper 140 may be considered to include or comprise a corresponding portion of the ground interface assembly 170. In certain embodiments, one or more ground interface mechanisms 172 may be mounted to each outer wing frame 132 such that each outer wing 130 comprises a portion of the ground interface assembly 170.

The height control assembly 180 is operable to control the height of the various sections relative to the ground 90 along which the equipment 100 travels. In the illustrated form, this height control also controls the depth to which the chisel plows 163 dig into the earth. As a result, the height control assembly 180 may alternatively be referred to as the depth control assembly 180. In the illustrated form, the height control assembly 180 adjusts the height of the work machine 100 (and thus the depth of the chisel plows 163) by adjusting the position of one or more of the ground interface mechanisms 172. It is also contemplated that a depth control assembly 170 may control the height/depth of the work components 162 in another fashion, for example by moving the work components 162 relative to the frames to which the work component 162 is mounted.

As noted above, the illustrated height control assembly 180 controls the height of the various frame sections by adjusting the vertical positions of one or more ground interface mechanisms 172 relative to the corresponding frame. Such ground interface mechanisms 172 under the control of the height control assembly 180 may be referred to herein as height-controlled ground interface mechanisms 182 of the height control assembly 180. The height control assembly 180 may include one or more actuators operable to control the relative positions of the height-controlled ground interface mechanisms 182. In the illustrated form, each of the ground interface mechanisms 172 is provided as a height-controlled ground interface mechanism 182. In certain embodiments, at least the outermost ground interface mechanisms 172 (e.g. the ground interface mechanisms 172 of the flippers 140) are height-controlled ground interface mechanisms 182. In certain embodiments, one or more of the ground interface mechanisms 172 may not necessarily be height controlled.

Each flipper 140 includes at least one ground interface mechanism 172, and in the illustrated form, the ground interface mechanism 172 of each flipper 140 is provided in the laterally-outward portion 148 of the flipper. As a result, the flippers 140 are not cantilevered when the work machine 100 is in its deployed state. This support provided by the ground interface mechanisms 172 of the flippers 140 may reduce the strain placed on the flippers 140 and/or the outer wings 130 during operation. In the illustrated embodiment, the ground interface mechanisms 172 of the flippers 140 are height-controlled ground interface mechanisms 182. This enables the height control assembly 180 to more precisely control the operating height of the flippers 140 and the height/depth of the work components 162 of the flippers 140. It is also contemplated that one or more of the remaining ground interface mechanisms 172 may be height-controlled ground interface mechanisms 182, such as the ground interface mechanisms 172 of the inner wings 120 and/or the ground interface mechanisms 172 of the main section 110.

Figure 4:
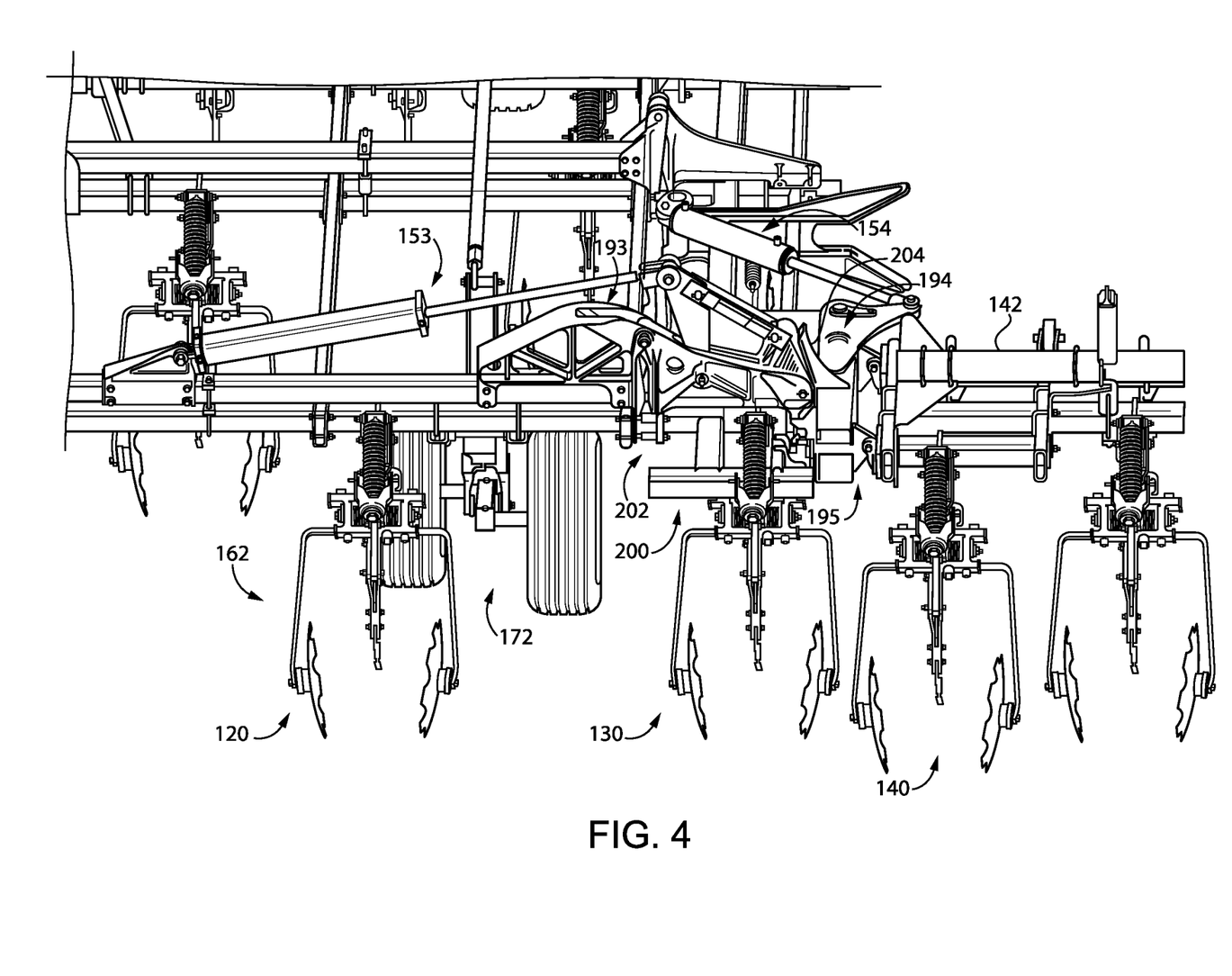
FIG. 4 illustrates a portion of the work machine in the unfolded state.

With additional reference to FIG. 4, the outer wing actuator 153 is operable to pivot the outer wing 130 about the respective second pivot axis 103 relative to the inner wing 120 as noted above. As also noted above, the outer hinges 193 facilitate this pivoting of the outer wings 130 between their deployed positions and their folded positions. While other angular ranges are contemplated, in the illustrated form, the deployed position is offset from the folded position by about 180°. Should the outer hinges 193 remain active during operation of the work machine 100, the flippers 140 may become unstable. In order to mitigate this risk, each outer hinge 193 may be deactivated by a corresponding stabilization assembly 200. In the illustrated form, the stabilization assembly 200 includes abutment members 202 that are secured to the inner wing frames 122 and the outer wing frames 132, and which abut one another when the outer wing 130 is deployed to prevent downward flexing of the outer wing 130. Each stabilization assembly 200 further includes an abutment plate 204 that abuts the outer hinge 193 and prevents upward flexing of the outer wing 130 when the flipper 140 is deployed or unfolded.

Figure 5:
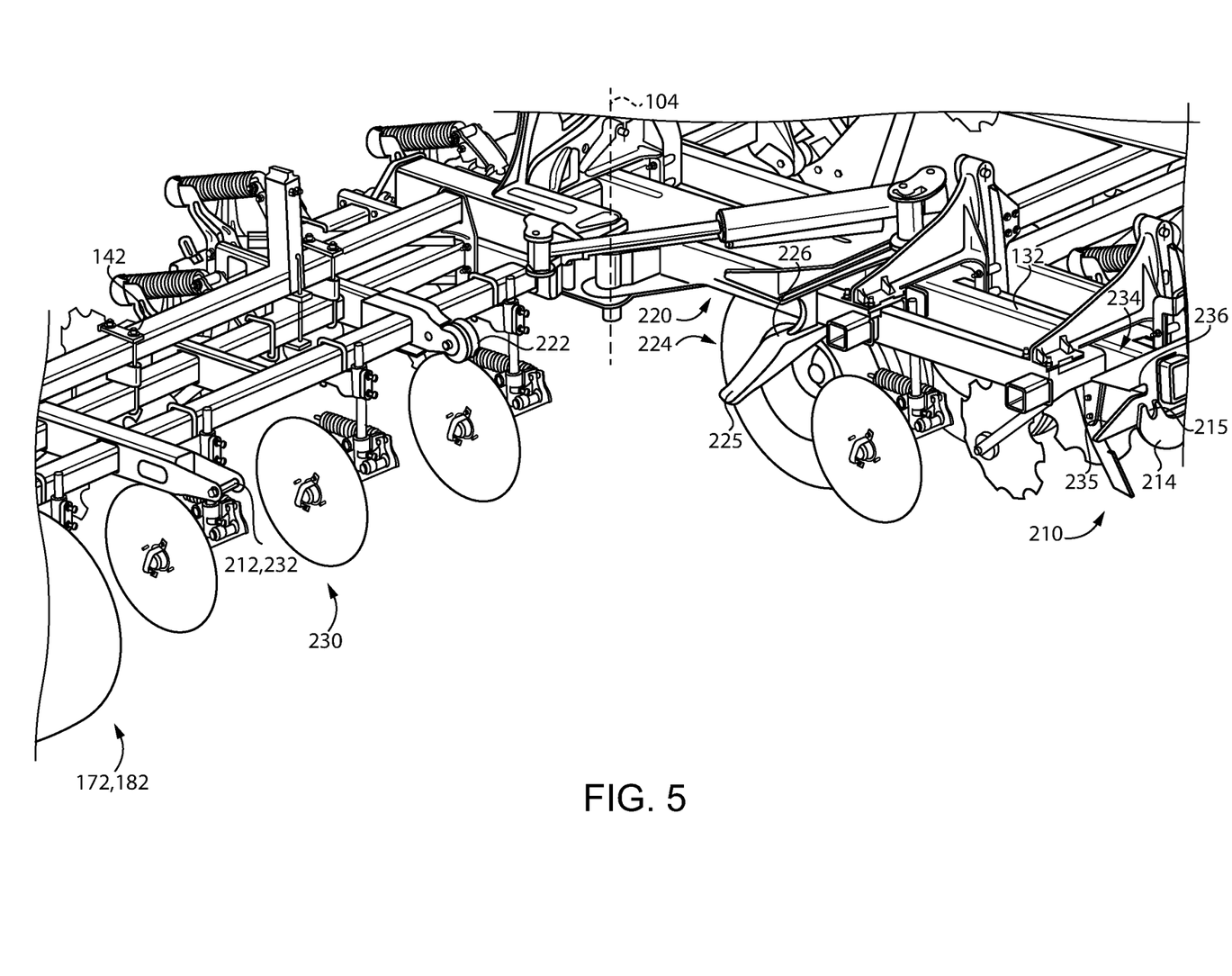
FIG. 5 is a perspective view of a portion of the work machine in the unfolded state.

With additional reference to FIG. 5, the illustrated work machine 100 also includes features that facilitate the folding of the flippers 140 and the retention of the flippers 140 in the folded positions. In the illustrated form, each side of the work machine 100 includes a latch mechanism 210 operable to selectively retain the flipper 140 in its folded position relative to the outer wing 130, a gross alignment mechanism 220 configured to provide gross alignment of the components of the latch mechanism 210 during folding, and a fine alignment mechanism 230 configured to provide fine alignment of the components of the latch mechanism 210 during folding.

The latch mechanism 210 includes a first latch component and a second latch component, which in the illustrated form are provided in the form of a latch bar 212 and a hook 214. In the illustrated embodiment, the latch bar 212 is secured to the flipper frame 142, and the hook 214 is pivotably mounted to the outer wing frame 132 for movement between a latching position and an unlatching position. It is also contemplated that the latch bar 212 may be secured to the outer wing frame 132, and that the hook 214 may be movably mounted to the flipper frame 142. The hook 214 includes a recess 215 operable to engage the latch bar 212 when the flipper 140 is in its folded position and the hook 214 is in its latching position. When so engaged, the latch mechanism 210 retains the flipper 140 in its folded position relative to the outer wing 130.

In the illustrated form, the hook 214 is a gravity hook that pivots of its own accord between its latching position and its unlatching position in response to movement of the outer wing 130 between its folded position and its unfolded position. More particularly, the hook 214 adopts its unlatching position when the outer wing 130 is unfolded or deployed, and adopts its latching position when the outer wing 130 is folded onto the inner wing 120. It is also contemplated that the hook 214 may not necessarily be provided as a gravity hook, and may instead be powered to move between its latching and unlatching positions, for example by an actuator.

The gross alignment mechanism 220 is configured to provide gross alignment of the components of the latch mechanism 210 during folding of the flipper 140, and generally includes a wheel 222 and a track 224 operable to engage the wheel 222. In the illustrated form, the wheel 222 is rotatably mounted to the flipper frame 142, and the track 224 is secured to the outer wing frame 132. It is also contemplated that the wheel 222 may be rotatably mounted to the outer wing frame 132, and that the track 224 may be secured to the flipper frame 142. The track 224 generally includes a ramp 225 that leads to a landing 226 such that during folding of the flipper 140, the wheel 222 travels along the ramp 225 and onto the landing 226.

The fine alignment mechanism 230 is configured to provide fine alignment of the components of the latch mechanism 210 during folding of the flipper 140, and generally includes an alignment bar 232 and a bracket 234 operable to receive the alignment bar 232. In the illustrated embodiment, the alignment bar 232 is secured to the flipper frame 142, and the bracket 234 is secured to the outer wing frame 132. It is also contemplated that the alignment bar 232 may be secured to the outer wing frame 132, and that the bracket 234 may be secured to the flipper frame 142. Moreover, in the illustrated form, the alignment bar 232 is the same component as the latch bar 212. It is also contemplated that the alignment bar 232 and the latch bar 212 may be provided as separate components. The bracket 234 generally includes a ramp 235 that leads to a slot 236 such that during folding of the flipper 140, the alignment bar 232 travels along the ramp 225 and into the slot 236, at which point the hook 214 is operable to engage the latch bar 212 to secure the flipper 140 in the folded position.

As noted above, the actuator assembly 150 is operable to transition the work machine 100 between a deployed or unfolded state for operation and a folded state for storage and transportation. During such a process, the work machine 100 may begin in the unfolded state illustrated in FIGS. 1-5. From this unfolded state, the actuator assembly 150 may be operated to transition the work machine 100 to the folded state illustrated in FIG. 9. The actuator assembly 150 may, for example, perform the steps described herein under control of a control assembly operable to control operation of the actuator assembly 150, such as the control assembly of the towing vehicle to which the work machine 100 is coupled.

Figure 6:
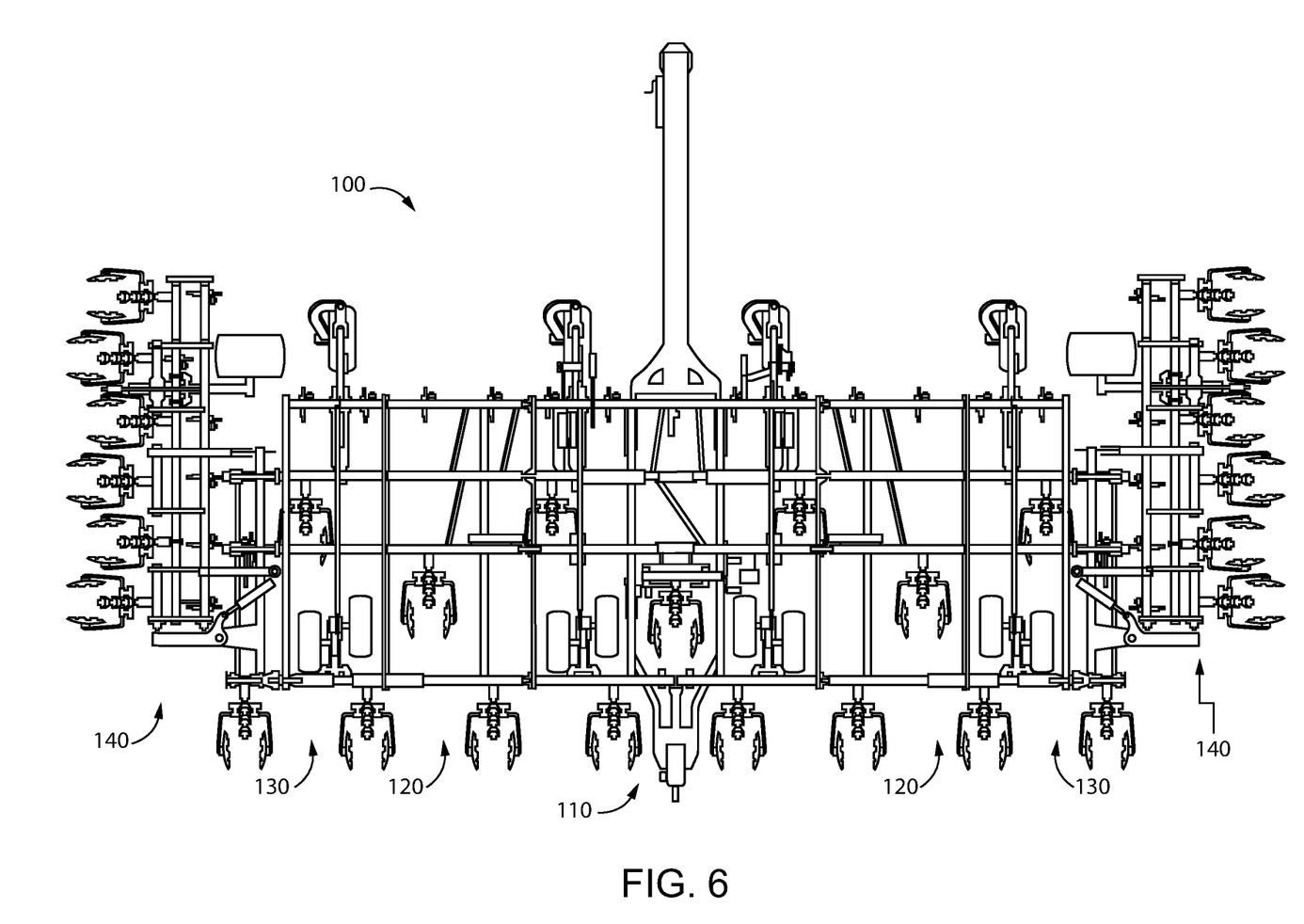
FIG. 6 is a plan view of the work machine in a first partially-folded state.

With additional reference to FIG. 6, the work machine 100 may be moved from the unfolded state (FIGS. 1-5) be moved to a first partially-folded state (FIG. 6) in which the flippers 140 have been moved to their folded positions. Such initial folding may involve operating the flipper actuators 154 to pivot the flippers 140 about the third axes 104. As the flippers 140 fold toward the outer wings 130, the ground interface mechanisms 172 of the flippers 140 support the flippers 140 such that the flippers 140 are not cantilevered.

As the flippers 140 approach their folded positions, the alignment mechanisms 220, 230 align the latch components 212, 214 such that each latch mechanism 210 is operable to retain the corresponding flipper 140 in its folded position. More particularly, during a first movement of the flipper 140 toward the folded position, the wheel 222 of the gross alignment mechanism 220 enters the track 224 and engages the ramp 225, which urges the latch components 212, 214 toward a more-aligned position or a grossly-aligned position. As the flippers 140 complete the first movement, the alignment wheel 222 travels into engagement with the landing 226. During a second movement of the flipper 140 toward its folded position, the alignment bar 232 engages the ramp 234 of the fine alignment mechanism 230, which ramp 234 urges the latch components 212, 214 toward their final aligned positions.

In the illustrated form, operation of the fine alignment mechanism 230 occurs only after the gross alignment mechanism 220 has provided the initial gross alignment. More particularly, the alignment wheel 222 engages the landing 226 before the alignment bar 232 engages the ramp 235. Stated another way, the fine alignment occurring during the second movement occurs only after the gross alignment of the first movement has completed. In other embodiments, the fine alignment of the second movement may begin while the gross alignment of the first movement is still occurring.

Once the flippers 140 have reached their folded positions, the work machine 100 is in its first partially-folded state (FIG. 6). In this first partially-folded state, the alignment bar 232 is received in the slot 236 and the latch bar 212 is aligned with the hook 214. Additionally, the abutment plates 204 are disengaged from the outer wing hinges 194 such that the outer wings 130 are operable to pivot vertically about the second axes 103.

Figure 7:
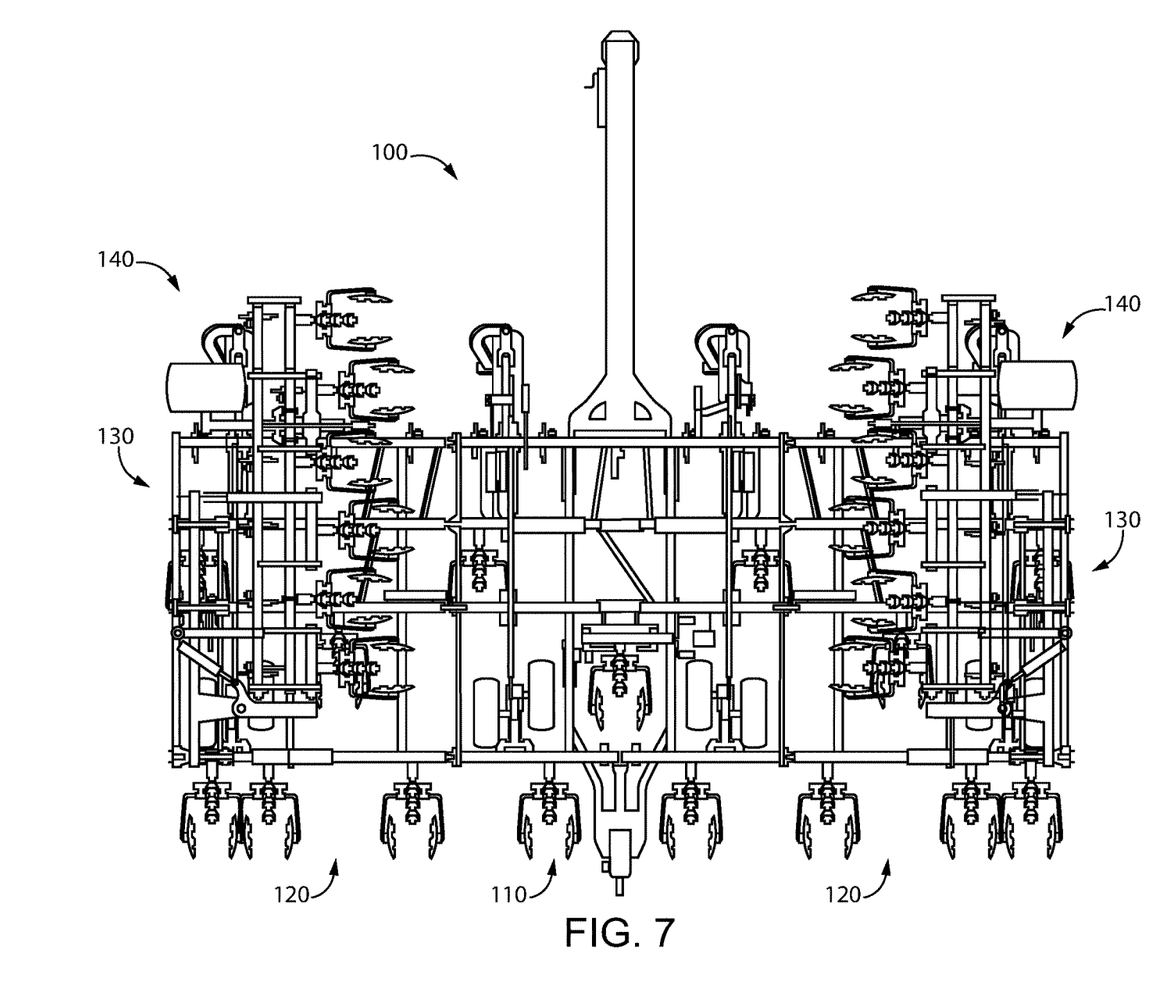
FIG. 7 is a plan view of the work machine in a second partially-folded state.
Figure 8:
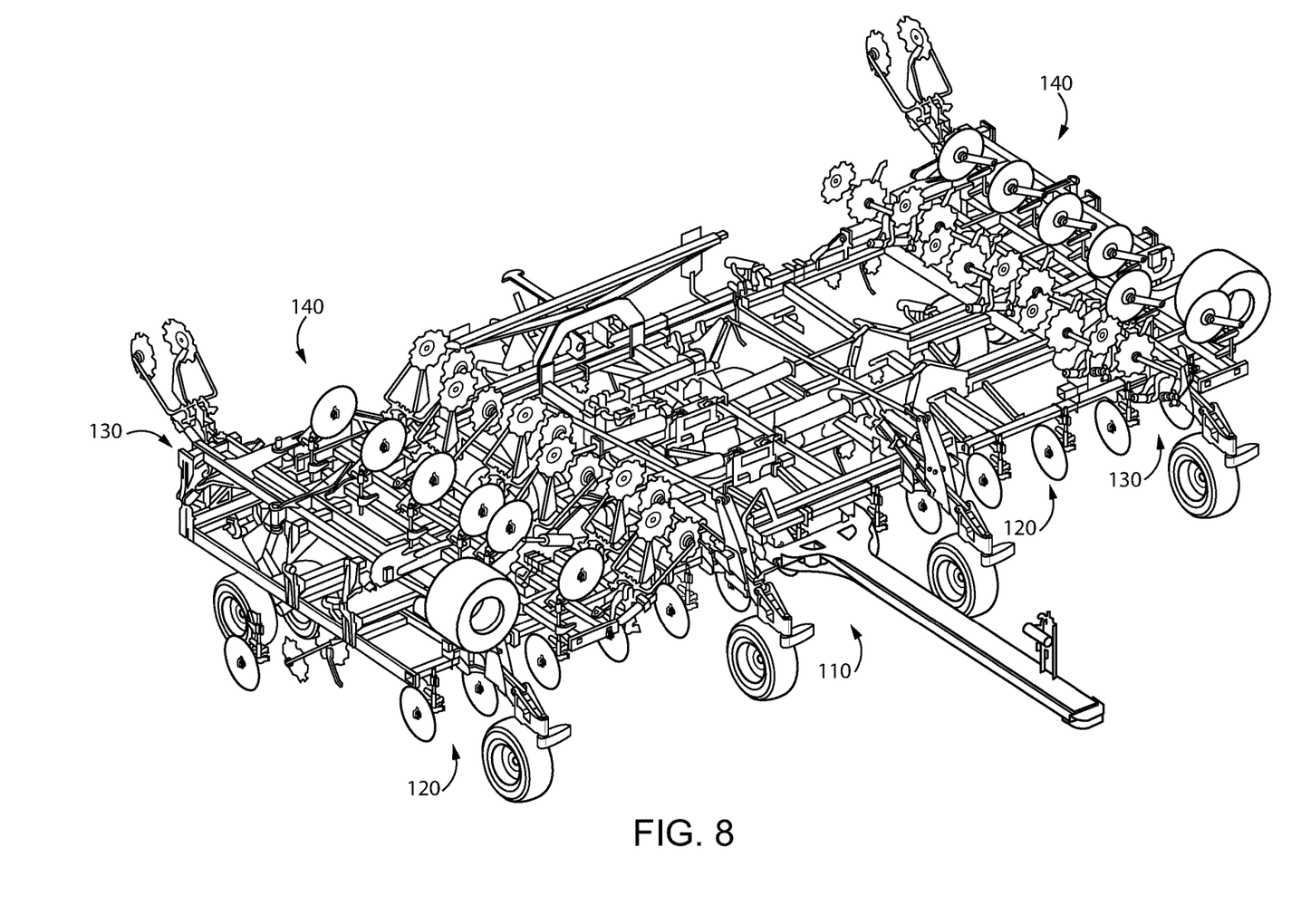
FIG. 8 is a perspective view of the work machine in the second partially-folded state.

With additional reference to FIGS. 7 and 8, the work machine 100 may be transitioned from the first partially-folded state (FIG. 6) to a second partially-folded state (FIGS. 7 and 8) by appropriate operation of the actuator assembly 150. More particularly, the outer wing actuators 153 may be actuated to pivot the outer wings 130 about the second axes 103 by about 180° to the folded positions illustrated in FIGS. 7 and 8, thereby placing the work machine 100 in the second partially-folded state. As will be appreciated, each flipper 140 pivots with the corresponding outer wing 130 as the work machine 100 transitions to the second partially-folded state.

As each outer wing 130 pivots toward its folded position, such pivoting drives the corresponding gravity hook 214 toward its latching position, thereby causing the locking recess 215 to receive the lock bar 212. With movement of the lock bar 212 prevented (in part by the bracket 224 and in part by the hook 214), movement of the flipper frame 142 relative to the outer wing frame 132 is inhibited. Thus, when the latch mechanism 210 is in its latching state, the flippers 140 are secured in their folded positions.

With additional reference to FIG. 9, the work machine 100 may be transitioned from the second partially-folded state (FIGS. 7 and 8) to a fully-folded state (FIG. 9) by appropriate operation of the actuator assembly 150. More particularly, the inner wing actuators 152 may be actuated to pivot the inner wings 120 about the first axes 102 by about 90° to the upright folded positions illustrated in FIG. 9, thereby placing the work machine 100 in the folded state. As will be appreciated, the outer wings 130 and flippers 140 pivot with the inner wings 120 as the work machine 100 transitions to the folded state.

It should be appreciated that the subject matter disclosed herein may present one or more advantages over existing work machines. As one example, the concepts disclosed herein may enable for a work machine to have a greater deployed wingspan that fits within a smaller transport package. For example, certain embodiments of the work machine 100 may have a deployed wingspan of up to about 68 feet, and fold into an envelope having a lateral width of about 18 feet and a height of about 14 feet. By contrast, certain existing work machines having a smaller wingspan of about 62 feet are only able to fold into a transport package having a width of about 21 feet and a height of about 16 feet. The increased wingspan of the illustrated work machine 100 may provide for more efficient work by reducing the number of passes required to perform the work on a particular tract of land, while the reduced transport envelope may enable the work machine 100 to be transported across roads and/or under overpasses that would be impassible for certain existing work machines.

Another advantage that may be provided in certain embodiments relates to the height control that may be provided to the flipper sections 140. More particularly, in embodiments in which the flipper sections 140 include height-controlled ground interface mechanisms 183, such height-controlled ground interface mechanisms 183 may provide a greater degree of control over the working height/depth of the work component(s) 172 installed to the flipper 140. This is in contrast to certain conventional work machines, in which the outer-most wheel is not height-controlled, and which are thus unable to control the working height/depth of the outermost work components with the same amount of control as may be provided by certain embodiments of the illustrated work machine 100.

Those skilled in the art will readily recognize that unfolding of the work machine 100 may occur by reversing the above-described folding process. For example, the work machine 100 may first be moved from the folded state (FIG. 9) to the second partially-folded state (FIGS. 7 and 8) by reverse operation of the inner wing actuators 152. The work machine 100 may then be moved to the first partially-folded state (FIG. 6) by reverse operation of the outer wing actuators 153, and subsequently moved to the unfolded or deployed state (FIGS. 1-5) by reverse operation of the flipper actuators 154.

Certain embodiments of the present application relate to a work machine 100, comprising: a main section 110 configured for connection with a towing vehicle and defining a longitudinal axis 101 that extends in a travel direction of the work machine 100; a pair of inner wings 120, wherein each inner wing 120 is pivotably connected with the main section 110 such that each inner wing 120 is operable to pivot relative to the main section 110 about a corresponding first axis 102, wherein each first axis 102 extends longitudinally; a pair of outer wings 130, wherein each outer wing 130 is pivotably connected with a corresponding one of the inner wings 120 such that each outer wing 130 is operable to pivot relative to the corresponding inner wing 120 about a corresponding second axis 103, wherein each second axis 103 extends longitudinally; a pair of flippers 140, wherein each flipper 140 is pivotably connected with a corresponding one of the outer wings 130 such that each flipper 140 is operable to pivot relative to the corresponding outer wing 130 about a corresponding third axis 104, wherein each third axis 104 extends transverse to the longitudinal axis 101; a work assembly 160 operable to perform a work function of the work machine 100, the work assembly 160 comprising a plurality of work components 162, wherein each flipper 140 comprises at least one corresponding work component 162 of the plurality of work components 162; a ground interface assembly 170 configured to interface between the work machine 100 and a ground surface 90, the ground interface assembly 100 comprising a plurality of ground interface mechanisms 172, wherein each flipper 140 comprises at least one corresponding ground interface mechanism 172 of the plurality of ground interface mechanisms 172; and a height control assembly 180 operable to adjust heights of the work components 162 relative to the ground surface 90.

In certain embodiments, the work machine 100 further comprises an actuator assembly 150 operable to transition the work machine 100 between a folded state and a deployed state, wherein the third axis 104 extends vertically when the work machine 100 is in the deployed state; and wherein the height control assembly 180 is operable to adjust the heights of the work components 162 relative to the ground surface 90 by adjusting positions of the ground interface mechanisms 172.

In certain embodiments, each first axis 102 and each second axis 103 is parallel to the longitudinal axis 101; or wherein each work component 172 comprises a chisel plow 173.

In certain embodiments, the ground interface mechanism 172 of each flipper 140 is configured to remain in contact with the ground surface 90 during folding of the corresponding flipper 140.

In certain embodiments, the work machine 100 further comprises a hinge assembly 190, the hinge assembly 190 comprising: a pair of inner wing hinge mechanisms 192, wherein each inner wing hinge mechanism 192 facilitates pivoting of a corresponding inner wing 120 of the pair of inner wings 120 about the corresponding first axis 102 between an inner wing folded position and an inner wing unfolded position; a pair of outer wing hinge mechanisms 193, wherein each outer wing hinge mechanism 193 facilitates pivoting of a corresponding outer wing 130 of the pair of outer wings 130 about the corresponding second axis 103 between an outer wing folded position and an outer wing unfolded position; and a pair of flipper hinge mechanisms 194, wherein each flipper hinge mechanism 194 facilitates pivoting of a corresponding flipper 140 of the pair of flippers 140 about the corresponding third axis 140 between a flipper folded position and a flipper unfolded position.

In certain embodiments, the work machine 100 further comprises a stabilization assembly 200, wherein the stabilization assembly 200 is configured to prevent pivoting of the outer wings 130 about the second axes 103 when the outer wings 130 are in the outer wing unfolded positions and the flippers 140 are in the flipper unfolded positions.

In certain embodiments, each flipper 140 has a longitudinally-extending centerline 146; and wherein one or more of the at least one ground interface mechanisms 172 is positioned laterally outward of the longitudinally-extending centerline 146.

Certain embodiments of the present application relate to hinged mobile agricultural equipment 100, comprising: a first section 130; a second section 140 pivotably coupled to the first section 130 for movement about a pivot axis 104 between a deployed position a folded position; a latch mechanism 210, comprising: a first latch component 214 mounted to the first section 130; and a second latch component 212 mounted to the second section 140; a gross alignment mechanism 220 configured to provide gross alignment of the first latch component 214 and the second latch component 212 during a first movement of the second section 140 from the deployed position toward the folded position; and a fine alignment mechanism 230 configured to provide fine alignment of the first latch component 214 and the second latch component 212 during a second movement of the second section 140 from the deployed position toward the folded position; wherein the latch mechanism 210 is operable to selectively retain the second section 140 in the folded position when the first latch component 214 and the second latch component 212 are aligned with one another.

In certain embodiments, the gross alignment mechanism 220 comprises a wheel 222 and a track 224; wherein the wheel 222 is rotatably mounted to one of the first section 130 or the second section 140; wherein the track 224 is mounted to the other of the first section 130 or the second section 140, and comprises a first ramp portion 225; wherein the wheel 222 is configured to enter the track 224 during the first movement such that the first ramp portion 225 engages the wheel 222 to thereby urge the first latch component 214 and the second latch component 212 toward a grossly-aligned position as a result of the first movement; wherein the fine alignment mechanism 230 comprises a bar 232 and a bracket 234; wherein the bar 232 is mounted to a first of the first section 130 or the second section 140; wherein the bracket 234 is mounted to a second of the first section 130 or the second section 140, and comprises a second ramp portion 235; wherein the bar 232 is configured to enter the bracket 234 during the second movement such that the second ramp portion 235 engages the bar 232 to thereby urge the first latch component 214 and the second latch component 212 toward a finely-aligned position as a result of the second movement.

In certain embodiments, one of the first latch component 214 or the second latch component 212 comprises the bar 232; and wherein the other of the first latch component 214 or the second latch component 212 comprises a hook 214 mounted for movement between a latching position in which the latch mechanism 210 retains the second section 140 in the folded position and an unlatching position in which the second section 140 is movable between the folded position and the deployed position.

In certain embodiments, the work machine further comprises an actuating assembly 150; wherein the actuating assembly 150 is operable to move the second section 140 from the deployed position to the folded position, and to thereafter move the first section 130 and the second section 140 from a first position to a second position; and wherein one of the first latch component 212 or the second latch component 214 comprises a gravity hook 214 that engages the other of the first latch component 212 or the second latch component 214 in response to movement of the first section 130 and the second section 140 from the first position to the second position.

Certain embodiments of the present application relate to hinged mobile agricultural equipment 100, comprising: a first section 120; a second section 130 movable relative to the first section 120; a third section 140 movable relative to the second section 130; a first hinge mechanism 193 connected between the first section 120 and the second section 130 and operable to facilitate pivoting of the second section 130 relative to the first section 120 about a first axis 103 between a second section folded position and a second section unfolded position; a second hinge mechanism 194 connected between the second section 120 and the third section 140 and operable to facilitate pivoting of the third section 140 relative to the second section 130 about a second axis 104 between a third section folded position and a third section unfolded position; a third hinge mechanism 195 connected between the second section 130 and the third section 140 and operable to facilitate pivoting of the third section 140 relative to the second section 130 about a third axis 105 when the third section 140 is in the third section unfolded position; and a stabilization assembly 200 configured to prevent pivoting of the second section 130 in a first direction about the first axis 103 when the second section 130 is in the second section unfolded position and the third section 140 is in the third section unfolded position.

In certain embodiments, the stabilization assembly 200 is further configured to prevent pivoting of the second section 130 in a second direction about the first axis 103 when the second section 130 is in the second section unfolded position and the third section 140 is in the third section unfolded position; and wherein the second direction is opposite the first direction.

In certain embodiments, the third axis 105 extends in a direction of the first axis 103; and wherein the second axis 104 extends transverse to the first axis 103 and the third axis 105.

In certain embodiments, the hinged mobile agricultural equipment further comprises a ground interface assembly 170 and a height control assembly 180; wherein the ground interface assembly 170 is configured to interface between the hinged mobile agricultural equipment 100 and a ground surface 90, the ground interface assembly 170 comprising a plurality of ground interface mechanisms 172; wherein the third section 140 comprises a ground interface mechanism 172 of the plurality of ground interface mechanisms 172; wherein the ground interface mechanism 172 of the third section 140 is configured to remain in contact with the ground surface 90 during movement of the third section 140 between the third section folded position and the third section unfolded position; and wherein the height control assembly 180 is operable to control a height of the third section 140 by adjusting a position of the ground interface mechanism 172 of the third section 140 relative to a frame 142 of the third section 140.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. Hinged mobile agricultural equipment, comprising:
a first section;
a second section movable relative to the first section;
a third section movable relative to the second section;
a first hinge mechanism connected between the first section and the second section and operable to facilitate pivoting of the second section relative to the first section about a first axis between a second section folded position and a second section unfolded position;
a second hinge mechanism connected between the second section and the third section and operable to facilitate pivoting of the third section relative to the second section about a second axis between a third section folded position and a third section unfolded position;
a third hinge mechanism connected between the second section and the third section and operable to facilitate pivoting of the third section relative to the second section about a third axis when the third section is in the third section unfolded position;
a latch mechanism comprising a first latch component and a second latch component, wherein the first latch component is mounted to the second section, and wherein the second latch component is mounted to the third section, wherein the latch mechanism is operable to selectively retain the third section in the third section folded position when the first latch component and the second latch component are aligned with one another; and
a gross alignment mechanism configured to provide gross alignment of the first latch component and the second latch component during a first movement of the third section from the third section unfolded position toward the third section folded position, wherein the gross alignment mechanism comprises a wheel and a track comprising a first ramp portion;
wherein the wheel is configured to enter the track during the first movement such that the first ramp portion engages the wheel to thereby urge the first latch component and the second latch component toward a grossly-aligned position as a result of the first movement.

2. The hinged mobile agricultural equipment of claim 1, wherein the third axis extends in a direction of the first axis; and
wherein the second axis extends transverse to the first axis and the third axis.

3. The hinged mobile agricultural equipment of claim 1, further comprising a ground interface assembly configured to interface between the hinged mobile agricultural equipment and a ground surface, the ground interface assembly comprising a plurality of ground interface mechanisms;
wherein the third section comprises a ground interface mechanism of the plurality of ground interface mechanisms; and
wherein the ground interface mechanism of the third section is configured to remain in contact with the ground surface during movement of the third section between the third section folded position and the third section unfolded position.

4. The hinged mobile agricultural equipment of claim 3, further comprising a height control assembly operable to control a height of the third section by adjusting a position of the ground interface mechanism of the third section relative to a frame of the third section.

5. The hinged mobile agricultural equipment of claim 1, further comprising:
a fine alignment mechanism configured to provide fine alignment of the first latch component and the second latch component during a second movement of the third section from the third section unfolded position toward the third section folded position.

6. The hinged mobile agricultural equipment of claim 5, wherein the fine alignment mechanism comprises:
a bar mounted to a first of the second section or the third section; and
a bracket mounted to a second of the second section or the third section, wherein the bracket comprises a second ramp portion;
wherein the bar is configured to enter the bracket during the second movement such that the second ramp portion engages the bar to thereby urge the first latch component and the second latch component toward a finely-aligned position as a result of the second movement.

7. The hinged mobile agricultural equipment of claim 6, wherein one of the first latch component or the second latch component comprises the bar; and
wherein the other of the first latch component or the second latch component comprises a hook mounted for movement between a latching position in which the latch mechanism retains the third section in the third section folded position and an unlatching position in which the third section is movable between the third section folded position and the third section unfolded position.

8. The hinged mobile agricultural equipment of claim 6, wherein the track further comprises a landing; and
wherein the bar is configured to engage the second ramp after the wheel engages the landing.

9. The hinged mobile agricultural equipment of claim 5, further comprising an actuating assembly;
wherein the actuating assembly is operable to move the third section from the third section unfolded position to the third section folded position, and to thereafter move the second section and the third section from a first position to a second position; and
wherein one of the first latch component or the second latch component comprises a gravity hook that engages the other of the first latch component or the second latch component in response to movement of the second section and the third section from the first position to the second position.

10. A work machine, comprising:
a main section configured for connection with a towing vehicle and defining a longitudinal axis that extends in a forward travel direction of the work machine;
an inner wing pivotably coupled to the main section and operable to pivot upward from an inner wing deployed position to an inner wing folded position;
an outer wing pivotably coupled to the inner wing and operable to pivot upward from an outer wing deployed position to an outer wing folded position;
a flipper pivotably coupled to the outer wing and operable to pivot between a flipper deployed position to a flipper folded position, wherein the flipper is configured to pivot forward toward alignment with the forward travel direction as the flipper pivots from the flipper deployed position to the flipper folded position;
a latch mechanism operable to selectively retain the flipper in the flipper folded position, the latch mechanism comprising a first latch component and a gravity hook operable to engage the first latch component, wherein the gravity hook is configured to remain in an unlatching position when the outer wing is in the outer wing deployed position, and to move to a latching position in response to movement of the outer wing from the outer wing deployed position to the outer wing folded position; and
an alignment mechanism operable to facilitate alignment of the first latch component and the second latch component as the flipper pivots forward toward the flipper folded position, wherein the alignment mechanism comprises a bar and a ramp operable to engage the bar.

11. The work machine of claim 10, wherein the flipper comprises a ground interface mechanism configured to interface between the work machine and a ground surface.

12. The work machine of claim 10, wherein the flipper comprises a work component configured to perform a function of the work machine.

13. A work machine, comprising:
a main section configured for connection with a towing vehicle and defining a longitudinal axis that extends in a forward travel direction of the work machine;
an inner wing pivotably coupled to the main section and operable to pivot upward from an inner wing deployed position to an inner wing folded position;
an outer wing pivotably coupled to the inner wing and operable to pivot upward from an outer wing deployed position to an outer wing folded position;
a flipper pivotably coupled to the outer wing and operable to pivot between a flipper deployed position to a flipper folded position, wherein the flipper is configured to pivot forward toward alignment with the forward travel direction as the flipper pivots from the flipper deployed position to the flipper folded position;
a latch mechanism operable to selectively retain the flipper in the flipper folded position, the latch mechanism comprising a first latch component and a second latch component operable to engage the first latch component; and
an alignment mechanism operable to facilitate alignment of the first latch component and the second latch component as the flipper pivots forward toward the flipper folded position, wherein the alignment mechanism comprises a wheel and a ramp operable to engage the wheel.

14. The work machine of claim 13, further comprising an additional alignment mechanism operable to facilitate alignment of the first latch component and the second latch component as the flipper pivots forward toward the flipper folded position, wherein the additional alignment mechanism comprises a bar and a ramp operable to engage the bar.

15. The hinged mobile agricultural equipment of claim 1, further comprising a stabilization assembly comprising a pair of abutments configured to mechanically prevent pivoting of the second section in a first direction about the first axis when the second section is in the second section unfolded position and the third section is in the third section unfolded position.

16. The work machine of claim 10, wherein the first latch component comprises the bar.

17. The hinged mobile agricultural equipment of claim 15, wherein the stabilization assembly is further configured to prevent pivoting of the second section in a second direction about the first axis when the second section is in the second section unfolded position and the third section is in the third section unfolded position; and
wherein the second direction is opposite the first direction.

* * * * *